Feb. 5, 1963 J. MUSTO 3,076,263
LINOLEUM KNIFE
Filed Feb. 19, 1962 2 Sheets-Sheet 1
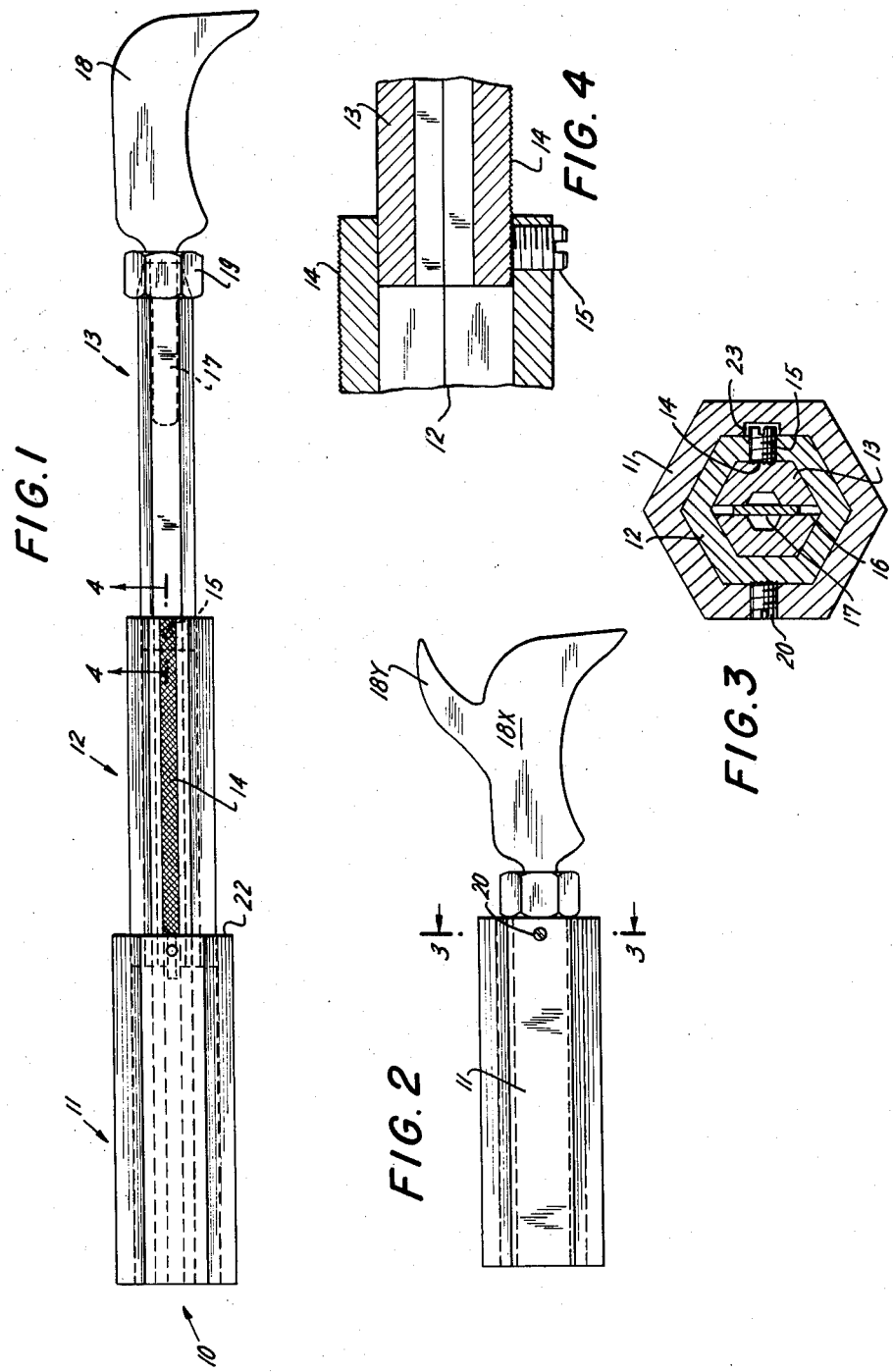

Feb. 5, 1963  J. MUSTO  3,076,263
LINOLEUM KNIFE
Filed Feb. 19, 1962  2 Sheets-Sheet 2

United States Patent Office 3,076,263
Patented Feb. 5, 1963

3,076,263
LINOLEUM KNIFE
Joseph Musto, P.O. Box 54, Locust Ave., Medford, N.Y.
Filed Feb. 19, 1962, Ser. No. 174,049
2 Claims. (Cl. 30—317)

This invention relates to a linoleum knife and more particularly to a collapsible linoleum knife.

The conventional linoleum knife is a short handled knife to which a perculiarly curved knife blade is attached. The use of such a knife to cut linoleum in difficult places such as around water pipes under sinks, etc., is very inconvenient.

According to this invention a linoleum knife is provided with selectively extendible means so that the distance from the handle to knife blade may be varied as desired.

Figure 5:
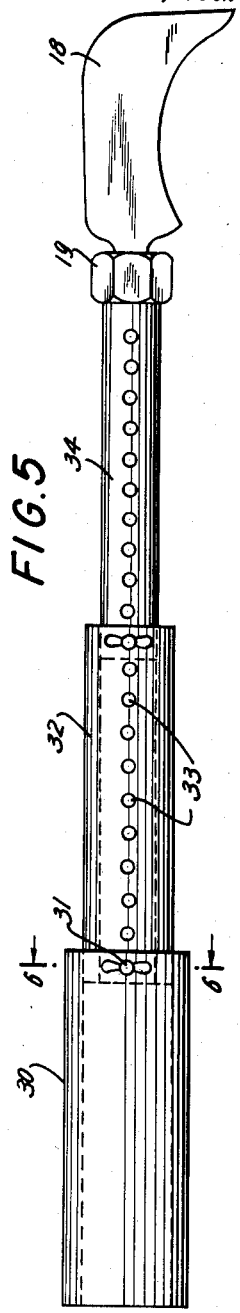
Figure 7:
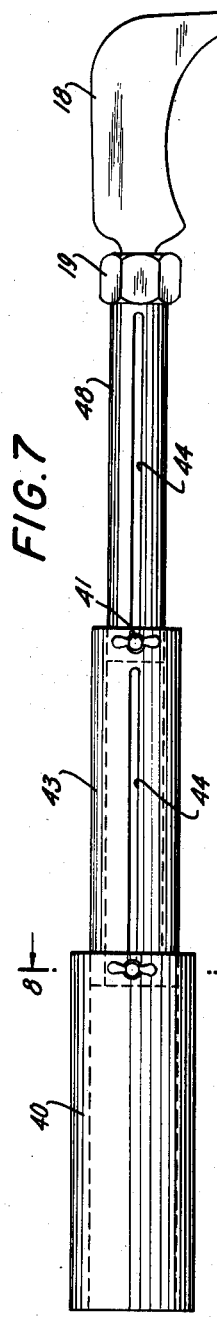
Figure 9:
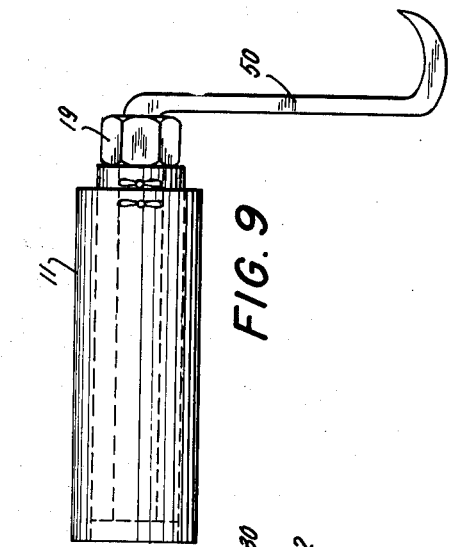
Figure 6:
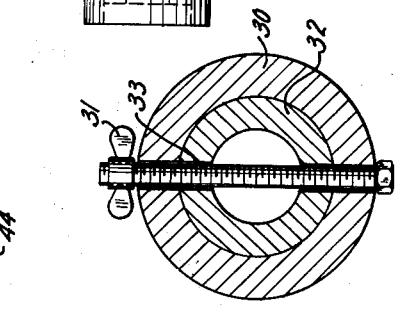
Figure 8:
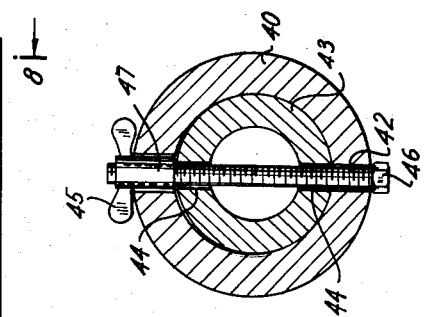

This invention will become readily apparent upon reading this descriptive disclosure taken in conjunction with a plurality of embodiments as shown in the accompanying drawing and in which;

FIG. 1 is a side elevation view of a preferred form of the knife in its extended position, sections, namely a handle, a middle section and a knife section, FIG. 2 is a side elevation view of the knife shown in its closed or collapsed position, FIG. 3 is a section view taken on line 3—3 of FIG. 2, FIG. 4 is a section view taken on line 4—4 of FIG. 1, FIG. 5 is a side elevation extended view of a modified form of the knife using wing nut and bolt means in conjunction with a plurality of suitable apertures, FIG. 6 is a section view taken on line 6—6 of FIG. 5, FIG. 7 is a side elevation view of another modification using a suitable elongated slot co-acting with a retaining wing nut and bolt combination, FIG. 8 is a section view taken on line 8—8 of FIG. 7, and FIG. 9 is a collapsed view showing a modified knife blade.

Turning to the drawing, and particularly to FIG. 1, an extended linoleum knife 10 comprises a handle section 11 of relatively large thickness, a middle section 12 and a knife section 13.

The sections 11, 12 and 13 are preferably of a polygonal transverse section so that rotation between the adjacent sections is prevented. However, cylindrical sections 11, 12 and 13 are operable and embraced within the scope of this invention.

Preferably a hexagonal transverse section is used however octagonal and other polygonal peripheries are operable.

Also the handle 11 may be provided with a cylindrical or round exterior surface but the longitudinal aperture therein may be hexagonal to receive section 12 having a hexagonal transverse section. And the cylindrical exterior of handle 11 may be modified by use of conventional procedure to provide end abutments on the handle to facilitate better seizure of the handle by the fingers of an operator's hand.

As shown in FIG. 1, the knife, and center or middle section are each preferably provided with a roughened area 14, which may optionally be of a corrugated undulation so that a set screw 15 disposed thereagainst is firmly seized by the area 14. Clearly sections having no roughened areas are also operable.

All the sections 11, 12 and 13 are tubular. The front rim of section 13 is split 16 in opposed edges to facilitate insertion of the prong 17 of a linoleum blade 18.

The front part of the split area of the knife section 13 is turned to a cylindrical shape and preferably provided with a taper and a co-acting tapered nut 19 is threaded onto the tapered threads of the knife section 13 to firmly seize the knife prong 17 in a locking engagement.

The blade 18 is selectively removable and a substituted blade for example 18X is inserted as needed where especially difficult cutting is encounted as around water pipes underneath sinks where cramped operating space is prevalent. In such cases the blade 18X is provided with an integral secondary knife edge 18Y especially adapted to overcome difficult cutting operations.

As shown in FIG. 4, the set screw 15 is threaded into the middle section 12 adjacent its rim nearest the knife and co-acts with a roughened area 14 disposed on the knife section 13. Similarly, a roughened area 14 disposed on section 12 in a manner opposed to the set screw 15 co-acts with a set screw 20 disposed in the handle section 11 adjacent to its front rim 22.

In order that the handle 11 may accommodate the set screw 15, it may be provided with an inner small channel 23 to receive the loosened set screw 15.

FIG. 5 shows a modification wherein a tubular cylindrical handle 30 is provided with a pair of linear apertures in its opposed walls (FIG. 6) and a wing nut with a co-acting threaded bolt combination 31 is disposable therethrough.

The middle section 32 is provided with a plurality of analogous linear apertures 33 disposed down the longitudinal dimension of said section 32. Also the knife section 34 is provided with a plurality of analogous linear apertures 33 and a similar wing nut and bolt combination 31 is used to secure selectively section 34 to section 32.

It is seen from the description above that the depth of insertion of a knife section is selective relative to the central section and that the depth of insertion of the central section itself is selective relative to the handle section.

A third form of this invention having the dual selectivity described above is shown in FIG. 7. In this modification the handle section 40 is a tubular cylinder and is provided with a pair of linearly disposed apertures, the top aperture 41 of which is of a slightly larger diameter than the diameter of the bottom aperture 42.

The middle section 43 is provided with a pair of opposed longitudinal slots 44 and with a front pair of apertures of dual diameters as hereabove described. A special wing nut 45 is disposed on a threaded bolt 46, said wing nut 45 having a depending shank 47 of a depth greater than the thickness of the section wall adjacent thereto. Thus when section 43 is to be slidingly inserted into the handle section 40, the wing nut 45 is loosened and then section 43 is slid into section 40 and the wing nut 45 is tightened until the base of the shank 47 seizes firmly the exterior surface of section 43. In this modification the wing and bolt combination is not removed from the handle and re-inserted as in the case of the wing and bolt combination 31 of the modification of FIG. 5.

The knife section 48 is also provided with a pair of opposed longitudinal slots 44 which co-act with a wing nut 45 and bolt 46 as previously described.

In the case of the modifications of FIG. 5 and FIG. 7, the sections 30, 32 and 34 are nested with the front ends thereof disposed in an adjacent pyramid configuration. This pyramid configuration is also attained when the sections of the modification of FIG. 7 are disposed in their collapsed form.

FIG. 9 shows a blade 50 one of the vast plurality of special blades that may be inserted interchangeably in the knife section.

Clearly by use of a wide selection of knives and the wide selection of handle length for these knives all difficult linoleum cutting jobs can be very easily overcome.

This invention is clearly of a broad scope and hence is not limited to the illustrations herein.

I claim:

1. A linoleum knife having a collapsible handle having a plurality of tubular sections insertable one into another comprising a handle section of greatest cross section width, a knife section of least cross sectional width and at least one middle section intermediate said handle and said knife sections, said knife section being provided with a split cylindrical tapered threaded rim adapted to receive the prong of a blade and to engage a tapered threaded nut and locking means comprising a set screw disposed adjacent to a respective co-acting rim, the longitudinal surface of a tubular section disposed beneath a set screw being provided with indentations to secure said set screw whereby said knife may be selectively extended at an infinite number of positions.

2. The knife of claim 1 wherein the locking means is a stationary wing nut and bolt combination disposed in suitably different diameter pair of linearly opposed apertures located adjacent to the rim of the handle and middle sections, and wherein the middle and the knife section are each provided with longitudinal pairs of slots disposed in opposed relationship, said wing nut having a suitably long exteriorly smooth and interiorly threaded aperture shank adapted to be inserted into the large diameter aperture of a respective tubular section to engage frictionally and in a locking relationship the tubular section therebeneath.

References Cited in the file of this patent

UNITED STATES PATENTS

| | | |
|---|---|---|
| 653,384 | Grove | July 10, 1900 |
| 1,073,565 | Biehl | Sept. 16, 1913 |
| 1,175,522 | Horn | Mar. 14, 1916 |
| 1,365,851 | Reynolds | Jan. 18, 1921 |
| 2,023,269 | Edgren et al. | Dec. 3, 1935 |
| 2,418,067 | Carpenter | Mar. 25, 1947 |
| 2,986,814 | Brinkman | June 6, 1961 |